Dec. 30, 1952     R. J. S. PIGOTT     2,623,384
BEARING AND LUBRICANT TESTER

Filed July 5, 1951     4 Sheets-Sheet 1

INVENTOR.
R. J. S. PIGOTT
BY G. M. Houghton

HIS ATTORNEY

Dec. 30, 1952 R. J. S. PIGOTT 2,623,384
BEARING AND LUBRICANT TESTER
Filed July 5, 1951 4 Sheets-Sheet 4

INVENTOR.
R. J. S. PIGOTT
BY
HIS ATTORNEY

Patented Dec. 30, 1952

2,623,384

UNITED STATES PATENT OFFICE 2,623,384

BEARING AND LUBRICANT TESTER

Reginald J. S. Pigott, Pittsburgh, Pa., assignor to Gulf Research & Development Company, Pittsburgh, Pa., a corporation of Delaware Application July 5, 1951, Serial No. 235,140

8 Claims. (Cl. 73—10)

This invention relates to the testing of bearings having complex load cycles such as those encountered in operation of an internal combustion engine, the invention being designed primarily for the testing of lubricants under simulated load conditions of reciprocating engine operation.

In reciprocating engines the connecting rod and main bearings are subjected to loads which vary both in magnitude and direction. The force components which result in the loads which must be sustained by the bearings of these engines are: first the gas force due to cylinder pressure; second, the inertia force due to the linear acceleration of a reciprocating mass; and third, the inertia force due to the centripetal acceleration of an unbalanced rotating mass.

Although there is some difference in their application, it is obvious that all internal combustion engine bearings are subjected to a combination of gas pressures and forces of inertia. Consequently, any information desired relative to the lubricant and bearing in the engine must be obtained from bearings and lubricants used under similar load conditions. Some features of bearing behavior can be determined fairly well by small scale tests; but after the undesirable bearings have been eliminated the promising ones must be observed in the type of service planned.

At present, most bearing testing and lubricant testing machines operate under a load that is constant in magnitude and direction. Hence, if information is required, such as the life expectancy of a bearing, effect of changes in bearing design, test bearing materials or lubricant performance in a dynamic loaded bearing, such information can be obtained only under operating conditions. Therefore, in any bearing tester or lubricant testing apparatus the problem is how to reproduce the precise conditions of service in a convenient and inexpensive manner.

As will be explained later in greater detail the essence of this invention is that a rotating load of varying magnitude on a bearing can be simulated by applying pressure oscillations to at least three points equidistant around the circumference of said test bearing, and varying the magnitude and phase of said oscillations in relation to a revolving shaft within said test bearing.

It is, therefore, an object of this invention to simulate more accurately the loads produced on bearings by internal combustion engines.

Another object of the present invention is to provide a simulacrum of any bearing load system in a machine whether unidirectional, oscillating, pulsating, or varying rapidly throughout the 360° of rotation.

A further object of this invention is the provision of a bearing and lubricant tester which will produce any type of load including a rotating load such as occurs in an internal combustion engine and provide for testing of a lubricant among different bearing designs or testing of many lubricants in a particular bearing design.

These and other objects are accomplished by the provision of the present bearing testing and lubricant testing machine.

While all testing machines designed for these objectives must produce a force or load between the bearing and shaft, a varying load testing machine must not only produce a force or load between the journal and bearing but also relative variation between load direction and load magnitude around the circumference of the bearing. In the present invention these two essentials are produced by at least three load-applying or pressure-applying units located equidistantly around the circumference of a test bearing holder which supports a test bearing within which a shaft is revolving. The load oscillations of the pressure applying unit and their resultant force are in a phase relationship with the shaft rotation. Means are provided for varying the magnitude of the oscillating forces.

From a consideration of the accompanying drawings the bearing testing and lubricant testing machine of the present invention will be more clearly understood.

In the accompanying drawing:

Figure 2 is an end view showing the pressure-transmission system in detail.

Figure 1:
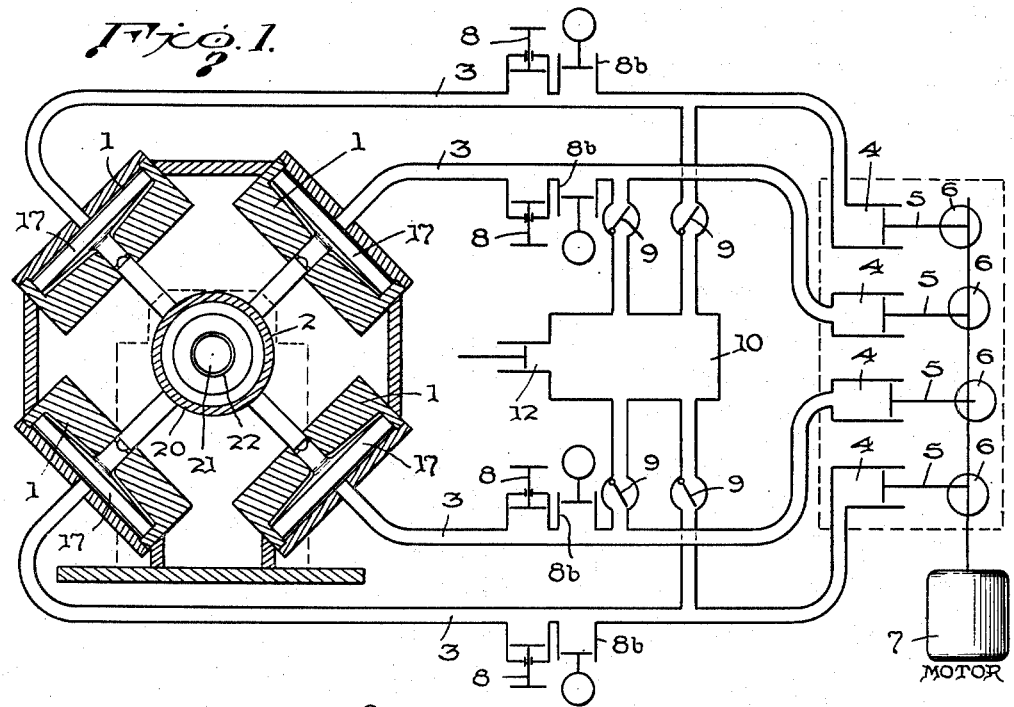
Figure 1 is a schematic layout of the testing machine comprising pressure-producing units, load-applying units, and a pressure-transmission system connecting them.

Referring first to Figure 1, the loading of the bearing is accomplished by means of at least three, preferably four, load-applying units 1 located equidistantly around circumference of the load ring assembly 2. A hydraulic load or pressure-transmitting line 3, containing any hydraulic fluid such as oil, etc., connects each load-applying unit 1 with a respective hydraulic pressure-producing cylinder 4. Within each pressure-producing cylinder 4 is an oscillating pressure-producing piston 5 which is driven through a cam 6 by motor 7, the several cams being mounted on the same shaft as will appear hereinafter. Since only one motor is used for driving all of the cams each hydraulic pressure-producing cylinder 4 is part of a single pressure-producing unit. A screw plunger 8 operating in a cylinder 8a provides a means of altering the volume of fluid in each load-transmitting line 3, thereby varying the degree of fluid compression of that load line system. A second pressure producing cylinder 8b that may alternately be combined with cylinder 8a or be a separate cylinder provides for a momentary and cyclic increase of the base pressure in the load line system independent of the remaining load cells and overriding the base pressure communicated to the separate load transmitting lines 3 from the common reservoir 10. Each of these cylinders 8b has a reciprocating piston which is mechanically operated by a cam, the several cams being mounted on the same drive shaft as cams 6 or on another shaft geared to it or coupled to it in any suitable manner. The pressure-producing cylinders 8b are designed to be operated selectively, individually or in multiple by means of variation of cam profile or by mechanical lockout of the inoperative cylinder in any known manner. Connected to the system through the check valves 9 is the reservoir 10 maintained at a selected base pressure to supply make-up fluid and prevent air from entering the system.

It is noted that there are at least three load-applying units 1 and an equal number of pressure-producing cylinders 4. A pressure-producing cylinder is connected to a load-applying unit through a separate hydraulic load-transmitting line 3.

By referring to Figure 2 it can be more easily understood how the selected base pressure is maintained and how the degree of fluid compression of the system is varied. Figure 2 shows in greater detail the pressure-producing unit, load or pressure-transmitting line 3, variable volume producing cylinder 8a, auxiliary pressure producing cylinder 8b and reservoir 10. Each of the auxiliary pressure producing cylinders is cam driven, with the driving cams mechanically coupled to the main pressure producing cylinder cam. The entire system can be operated at any selected base pressure which can be ascertained from pressure gauge 11. In this instance this pressure is maintained by gear pump 12 and pressure relief valve 13 which are connected to a manifold 14 by lines 15 and 16. By the use of manifold 14 only one fluid supply pump 12 need be used, since each load-transmitting line 3 is connected to said manifold 14 through a check valve 9, but an overriding pressure impulse may be transmitted in any line 3 by operation of one or more of the pressure producing cylinders 8b. For the sake of simplicity only one load-transmitting line 3 has been shown in Figure 2 instead of four and cylinders 8b are schematically shown. As mentioned in connection with Figure 1 each hydraulic pressure-transmitting line 3 connects a load-applying unit 1 to a respective hydraulic pressure-producing cylinder 4 which is part of a single pressure-producing unit, shown in Figure 2 as a four cylinder oscillator. Figure 2 shows pressure-producing pistons 5 being driven by motor 7 through cams 6, which are all mounted on the same shaft. The degree of fluid compression can be varied by changing cam profiles or by altering the volume of fluid in line 3 by some means such as screw plunger 8 operating in cylinder 8a. As previously noted there are three other lines 3 not shown in Figure 2 which connect to the several pressure-producing units from manifold 14, and to each respective load-applying unit 1.

Figure 3:
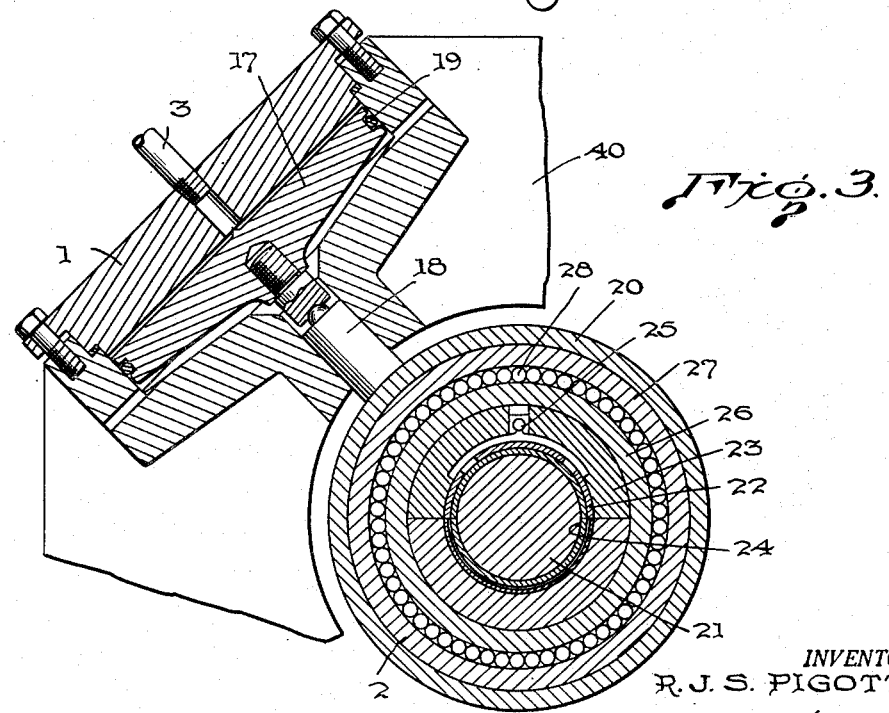
Figure 3 is a transverse quarter section through one load-applying unit.
Figure 6:
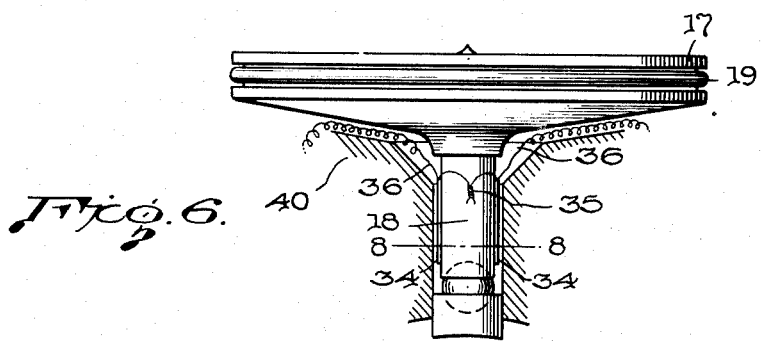
Figures 6 and 7 show the mechanism for measuring force.

Referring now to Figure 3 one load-applying unit 1 and the load ring assembly 2 are shown. Each load-applying unit includes a load-applying piston 17 and a load-imparting pin 18. Each load-applying piston 17 is oscillated by the fluid in its respective hydraulic load-transmitting line 3, loss of fluid being prevented by a ring gasket 19. There are two vents, not shown in the drawings, in each load cell cylinder to permit escape of air when filling the system. These vents are located on a diameter in the outer circumference of unit 1 and lead to the fluid chamber. Load-applying piston 17 is positioned to oscillate against load-imparting pin 18 which in turn oscillates against load-imparting ring 20 substantially in radial direction. During operation, however, when there is a strain upon load ring 20, there may be a force tending to move the load-imparting pin away from the radial direction. To compensate for this tendency the stem of load-applying piston and load-imparting pin may consist of two elements connected by means of a self aligning ball joint, or the pin may have a ball in a cavity at its end as shown in Figure 6. Thus, the pressure transmitted to the piston is applied by the piston stem to load-imparting pin 18, and by the load-imparting pin to the load ring assembly 2 with which it is in contact.

Figure 4:
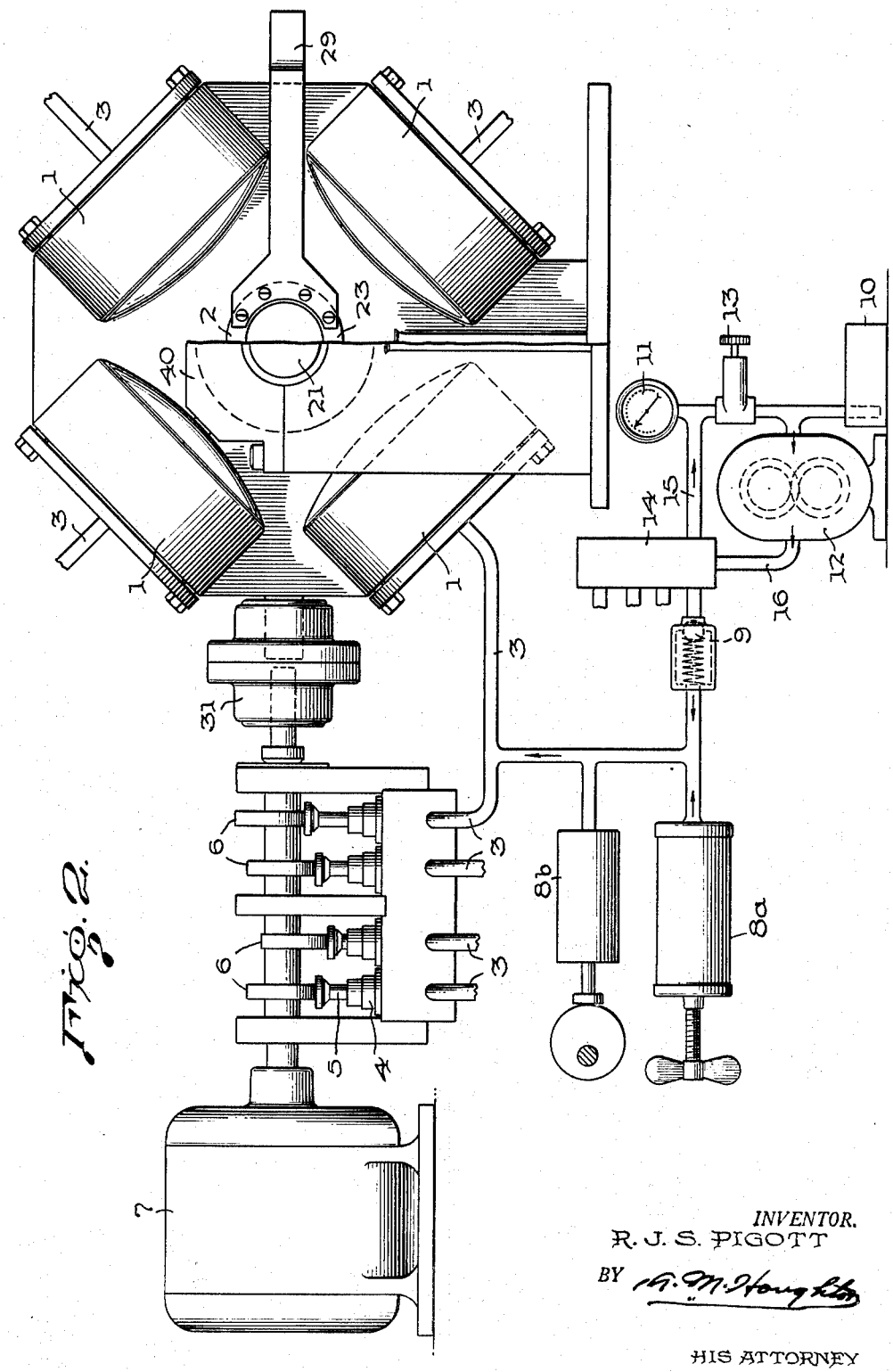
Figure 4 is a longitudinal section of the load assembly 2 shown in Figure 3.

Referring again to Figure 3, load ring assembly 2 is shown in greater detail. Its essential elements for producing a rotating and pulsating load are a rotatable shaft 21 mounted to revolve within the inner surface of a split or solid test bearing 22, a test bearing holder 23 for split or solid bearings around the outside surface of the test bearing, and the load-imparting ring 20. Other elements are usually used, particularly since certain measurements are necessary in simulating bearing loads. For example, I prefer to use a sleeve 24 on the shaft 21 so that the shaft itself will not wear. Because of a press fit the sleeve rotates with said shaft without slipping. In addition, inasmuch as the measurement of torque is important in a bearing tester, means must be provided to indicate the bearing friction force. Even though the test bearing is lubricated through oil inlet 25, the test bearing 22, along with the test bearing holder 23, will tend to rotate in the direction the shaft is turning. In order to measure this friction drag accurately by some device such as a brake arm, an anti-friction bearing must be inserted between test bearing holder 23 and load ring 20. Its inclusion should not distort the imposed force pattern on the test bearing. In the embodiment shown, this anti-friction bearing consists of an inner race 26 fitting around the outside of test bearing holder 23, and an outer race 27 within and in contact with load-imparting ring 20. There are needle rollers 28 between inner and outer race rings. It is to be noted that the outer race 27 may function also as the load-imparting ring, permitting the load-imparting ring 20 to be omitted when the outer race 27 is made sufficiently strong. The test bearing holder 23, as shown in Figure 4, also serves as a torque arm support since torque arm 29 which is used to measure torque as described hereinafter is rigidly connected thereto.

By referring to the various figures the operation of this device for stimulating rotating and pulsating loads on bearings can be readily understood. During operation, as can be seen from Figures 1 and 2, motor 7, through cams 6, actuates pressure-producing pistons 5 which, by oscillating, compress intermittently the fluid in each hydraulic pressure-transmitting line 3. A momentary and cyclic increase of base pressure in any one or more of the lines 3, independent of the others, may be achieved by cam operation of the additional pressure producing cylinders 5b. The compression of the fluid in each pressure-transmitting line in turn causes each load-applying piston 17 to oscillate. The actual movement of any one load-applying unit is no more than a few thousandths of an inch; so there is no appreciable work done in this operation. Since the load-applying piston 17, the load-imparting pin 18 and the load-imparting ring 20 are all in close contact, as is clear from Figure 3, at any base pressure level, there will be an oscillating force acting against the load ring, and with an assembly as shown the force will be applied at three or more points equidistant around the circumference of said load ring. By varying the magnitude of this force, and by time-phasing the oscillations with the speed of the rotating shaft, a rotating and pulsating bearing load can be simulated. The load may be in any direction, or the load may be a reciprocating bearing load relative to shaft rotation.

Figure 5:
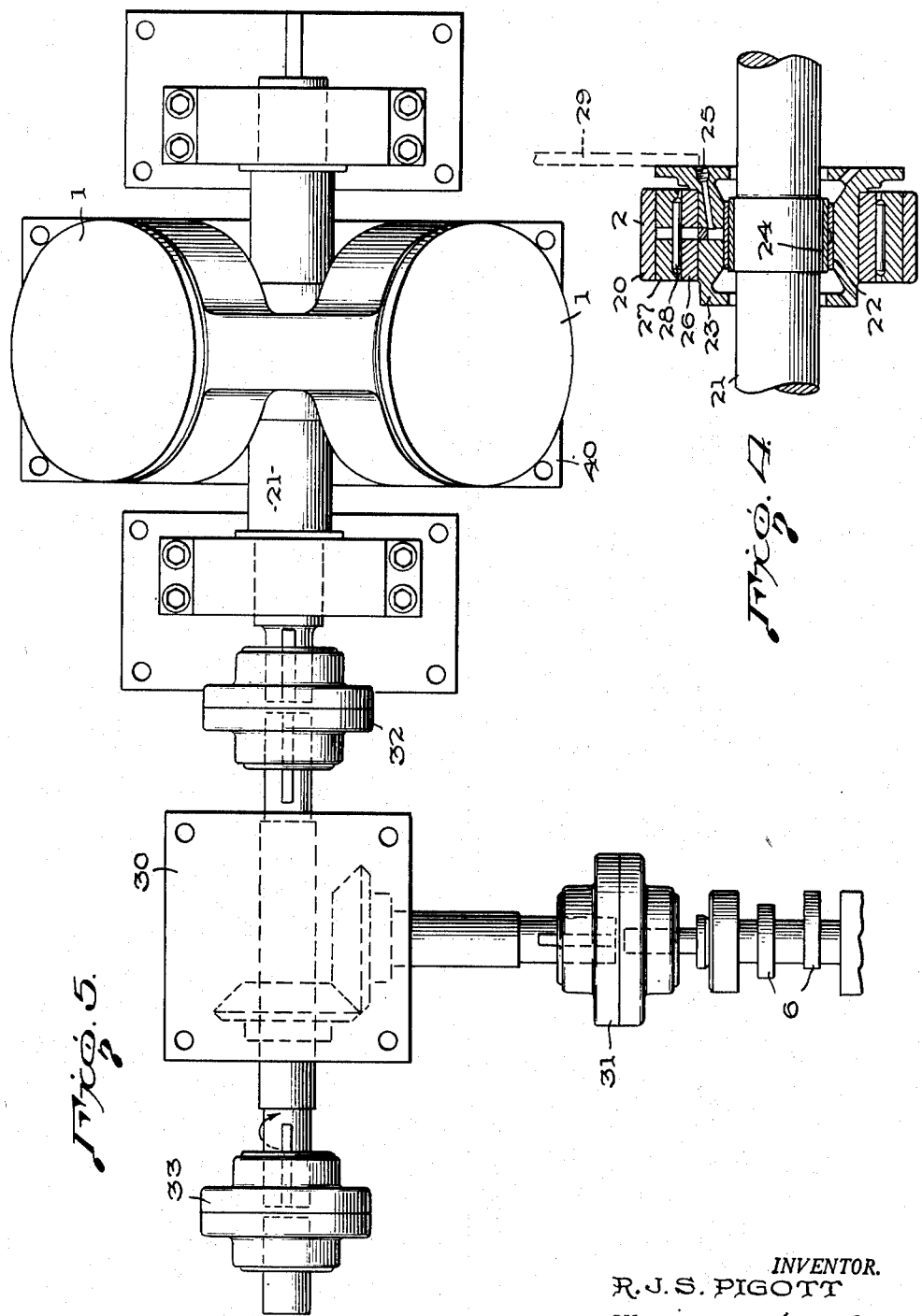
Figure 5 is a top view, in part, showing how the shaft and oscillator are geared together.

It was stressed that the magnitude of the force is varied, and the oscillations are synchronized with the speed of the revolving shaft. The magnitude of the force can be varied either by varying the volume of the load-transmitting system by manipulation of screw plunger 8 or by varying cam profiles. The oscillations can be synchronized with the speed of the shaft by means of gearing, as shown in Figure 5. Figure 5 is a partial top view of the bearing tester disclosed herein, showing how the shaft 21 and the pressure-producing unit are geared together. The cams 6 through which the pressure-producing pistons are actuated are mounted on a common shaft which is geared to shaft 21 at 30 through suitable couplings 31 and 32. The motor could be attached to the cam shaft as indicated diagrammatically in Figure 1, or an extension of shaft 21 through the gear box 30 may be provided for drive through coupling 33.

Figure 8:
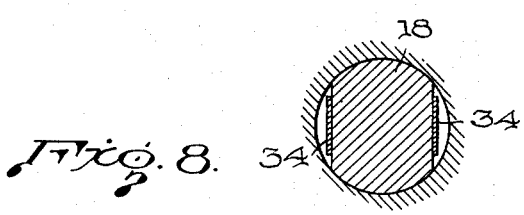
Figure 8 is a sectional view along line 8—8 of Figure 6.

Since the force acting on the load ring can be determined by means well known to those skilled in the art, a force pattern can be easily duplicated. Torque can also be readily determined. One system for measuring force is disclosed in Figures 6 and 8. Two active resistance strain gauges 34 can be attached to each side of each load-imparting pin 18, and are connected in series at 35 as shown in Figure 6. Magnetic strain gauges could, instead, be used and attached to each of the load-imparting pins.

Figure 7:
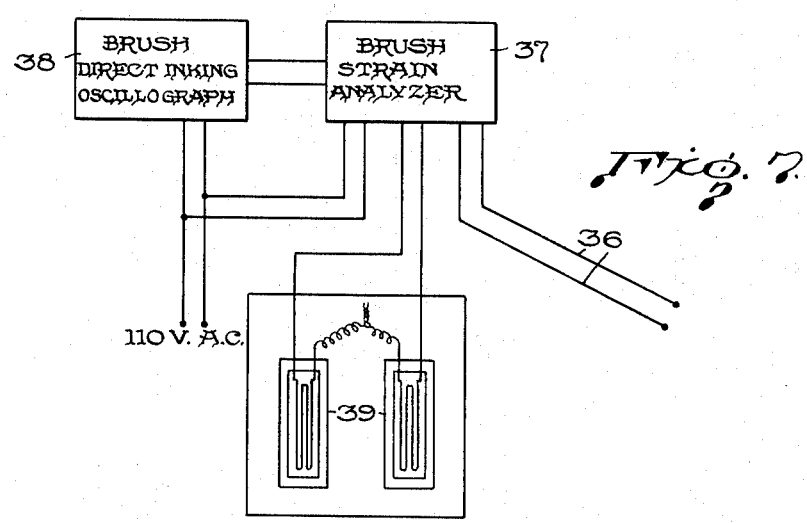

Since there will be a high speed of load variation, it is convenient to use load indicators of the recording type as shown in Figure 7. Leads 36 of the strain gauges, therefore, should lead to a strain analyzer 37 and a direct inking oscillograph 38 or oscilloscope or indicating meter. It will be noted that there is shown also a pair of dummy strain gauges 39, which are also connected in a bridge circuit with the active gauges. These dummy strain gauges, of the same resistance as active gauges 34, are connected in the circuit for temperature compensation. They are attached to the block 40 in which the load imparting units are supported, since the block temperature and the load-imparting pin temperature will be approximately the same. Now, in measuring the force of each load-imparting pin, impulses from the gauges, that is, changes in resistance, are picked up on an analyzer 37 (such as a brush amplifier and strain analyzer) and are recorded at the direct inking oscillograph 38. The oscillograph is calibrated to record in pounds, and it provides a continuous record of the force component exerted on the test bearing along the center-line of opposite cells. An alternative to the use of external dummy gauges 39, permissible only with load cells in pairs along an axis, is to connect the indicator of the two load cells along one axis as active arms of the same bridge circuit in a manner such that a combined signal will be the resultant force along that axis. This load phasing of the indicators is possible with the brush amplifier and strain analyzer.

One method of measuring torque is by the use of a brake arm or torque arm 29 shown in Figures 2 and 4. The torque arm is connected to the test bearing holder as illustrated. It can be of any desired length and the force at its free end can be easily measured, e. g., by spring balance weights, etc. The weight multiplied by the length of the arm, that is the distance to the shaft, gives the torque directly, for instance, in inch-pounds. Another method of determining torque would be to secure the free end of torque arm 29 and attach a resistance strain gauge to said torque arm to measure stress. Alternatively, the resistance strain gauge could be attached to a separate strain element link secured to the end of the torque arm.

Three or more load-applying units acting against a load ring at three or more points equidistant around the circumference of said load ring can be used to simulate a radial load on a test bearing. However, I prefer four load-applying units spaced 90° apart around the circumference of the load ring because this provides radial force components at right angles and calculations can be more easily made when a polar load is simulated. The force component is transmitted through the load-applying and load-imparting units and acts on the test bearing in the direction of the load-applying unit center line. Since the force pattern from each load cell can be accurately recorded, it is only necessary to make adjustments in the hydraulic system and the oscillator system to produce a desired pattern. These adjustments are made in oscillator speed, volume of the fluid system, cam profile and phasing of the cams with each other and with the test bearing shaft. Phasing is achieved by suitably gearing together the oscillator shafts and the test bearing shaft. This gearing can be altered for any particular pattern. Oscillator or load-producing piston movement will be a function of the cam profile which will be determined by a particular load pattern. Since the force on the load ring assembly is roughly proportional to the cam lift, the profile can be predicted fairly accurately from a consideration of the desired load component force pattern and allowance for slight movement of the load-applying piston. The resultant of the four force components forms a force which may be varied in magnitude and direction, and its path may be made to pattern the desired polar load diagram. In other words, it is possible to produce a force pattern on the bearing of sufficient intensity and frequency to match the force component of a dynamically loaded bearing in the direction of the load-applying unit. Variations and modifications will obviously occur to those skilled in the art.

What I claim is:

1. A device for producing rotating and pulsating loads on test bearings in the testing of lubricants, which comprises a test bearing adapted to receive a rotatable shaft, a load-imparting ring around the outer surface of the test bearing, at least three hydraulically-operated pressure-applying units located equidistantly around the circumference of said load-imparting ring and transmitting force components thereto simulating operating load, means for producing pressure oscillation in said pressure-applying units at a base pressure level, each hydraulically-operated pressure-applying unit being independent of the others and coupled with said means for producing pressure oscillations, means for varying the compression in the hydraulic system for establishing a selected base pressure, and means for synchronizing the pressure oscillations with the speed of the revolving shaft.

2. A device for simulating rotating and pulsating loads on a bearing in the testing of lubricants, which comprises a test bearing adapted to receive a rotatable shaft, a load-imparting ring embracing said test bearing, at least three load-applying units located equidistantly around the circumference of the load-imparting ring and capable of applying force against the ring, an equal number of hydraulic oscillator units, means for operating the hydraulic oscillator units in selected sequence at a selected base pressure level, a hydraulic pressure-transmitting system connecting each oscillator unit to a load-applying unit, means for independently varying the compression in the system connecting each oscillator unit to a respective load-applying unit, and means for synchronizing the pressure oscillations with the speed of the rotating shaft.

3. A device for simulating rotating and pulsating loads on bearings in the testing of lubricants, comprising a test bearing adapted to receive a rotatable shaft, a test bearing holder fitting around the outside surface of the test bearing, an inner race fitting around the outside surface of said test bearing holder, an outer race, needle rollers between said inner race and said outer race, at least three load-imparting pins located equidistantly around the circumference of the outer race and capable of exerting radially applied force against said outer race, a load-applying hydraulic piston capable of oscillating against each load-imparting pin, an equal number of hydraulic pressure-producing cylinders, a hydraulic pressure-transmitting system connecting each hydraulic pressure-producing cylinder to a load-applying piston, cam means for producing pressure oscillations within each pressure-producing cylinder in predetermined sequence, means for producing momentary and cyclic increases in base pressure in each hydraulic pressure transmitting ssytem independently of the others, and means for time-phasing the pressure oscillations with the speed of the rotating shaft.

4. A device for simulating rotating and pulsating loads on bearings in the testing of lubricants, comprising a test bearing, a shaft rotatable within the inner surface of the test bearing, a test bearing holder fitting around the outside of the test bearing, a load-imparting ring embracing the test bearing holder, an anti-friction bearing between and in close contact with said test bearing holder and said load-imparting ring, a torque arm extending from said test bearing holder, means associated with said torque arm for measuring the force tending to cause its movement with shaft rotation, at least three load-applying units located equidistantly around the circumference of the load-imparting ring and capable of applying force against said load-imparting ring, an equal number of hydraulic oscillator units, means for operating the same in selective sequence at any base pressure level, a hydraulic pressure-transmitting system connecting each oscillator unit to a load-applying unit, means for independently varying the compression in the hydraulic system connecting each oscillator unit to a respective load-applying unit, means for synchronizing the pressure oscillations with the speed of the rotating shaft, and means for exhibiting strains imposed upon the several load applying units.

5. A device for simulating rotating loads on bearings in the testing of lubricants, comprising a test bearing, a rotatable shaft to revolve within the inner surface of the test bearing, a test bearing holder fitting around the outside surface of the test bearing, an inner race fitting around the outside surface of said test bearing holder, an outer race, needle rollers between said inner race and said outer race, a torque arm extending from said test bearing holder, means associated with said torque arm for measuring torque in rotation of the shaft as transmitted to the test bearing, load-imparting pins located equidistantly around the circumference of the outer race and capable of intermittently applying pressure against said outer race, means associated with each load-imparting pin for exhibiting strain, a load-applying hydraulic piston in contact with each load-imparting pin, an equal number of hydraulic pressure-producing cylinders, a hydraulic pressure-transmitting system connecting each hydraulic pressure-producing cylinder to one of said load-applying pistons, a piston within each pressure-producing cylinder for oscillating the fluid within said pressure-transmitting system, means for oscillating each pressure-producing piston, means for varying the degree of fluid compression in the system and means for time-phasing the pressure oscillations with the speed of the revolving shaft.

6. A bearing and lubricant testing machine comprising a test bearing, a shaft mounted to rotate within the test bearing, a test bearing holder fitting around the outside of the test bearing, a load-imparting ring embracing the test bearing holder, an anti-friction bearing between and in close contact with said test bearing holder and said load-imparting ring, four load-imparting pins capable of oscillating against the outside surface of said load-imparting ring in radial direction and located 90° apart around the circumference of said load-imparting ring, a load-applying piston positioned to be oscillated against each load-imparting pin, an equal number of hydraulic pressure-producing cylinders, a fluid-containing hydraulic load-transmitting line connecting each load-applying piston to a main and an auxiliary pressure-producing cylinder, a pressure-producing piston within each pressure-producing cylinder for oscillating the fluid within the respective load-transmitting line communicating therewith and for imparting cyclic increases in base pressure in the individual load transmitting lines, a motor driven cam shaft, cams thereon presented to each pressure-producing piston for oscillating said pistons in predetermined sequence, whereby by varying the cam profiles the degree of fluid compression in the hydraulic system and the oscillation of each load-applying piston may be varied, means for coupling said motor to said shaft for rotating the same with said cams and thereby synchronizing the pressure oscillations with the speed of the rotating shaft, means for determining the force which each load-imparting pin exerts upon the load ring, and means for determining torque.

7. A bearing and lubricant testing machine comprising a rotatable shaft, a test bearing in which said shaft is journalled, a test bearing holder fitting around the outside of the test bearing, an inner race ring fitting around the outside surface of said test bearing holder, an outer race ring, needle rollers between said inner and outer race rings, a load-imparting ring fitting around the outside surface of said outer race ring, four load-imparting pins capable of oscillating against the outside surface of said load-imparting ring and located 90° apart around the circumference of said load ring, a load-applying piston positioned to be oscillated against each load-imparting pin, an equal number of hydraulic pressure-producing cylinders, a fluid-containing hydraulic load-transmitting line connecting each load-applying piston to a pressure-producing cylinder, a pressure-producing piston within each pressure-producing cylinder for oscillating the fluid within said load-transmitting line, a motor driven shaft carrying cams which bear upon the several pressure-producing pistons for oscillating said pistons in predetermined sequence, the variation of cam profiles thereby varying the degree of fluid compression in the hydraulic system and the oscillations of individual load-applying pistons, gearing for driving said rotatable shaft from said motor driven shaft, thereby synchronizing the oscillations of the load-applying pistons with the speed of the rotating shaft, means for determining the force which each load-imparting pin exerts upon the load ring, and means for determining torque.

8. A bearing and lubricant testing machine comprising a test bearing, a shaft rotatable within the test bearing, a test bearing holder fitting around the outside of the test bearing, an inner race ring fitting around the outside surface of said test bearing holder, an outer race ring, needle rollers between said inner and outer race rings, a load-imparting ring fitting around the outside surface of said outer race ring, four load-imparting pins capable of oscillating against the outside surface of said load-imparting ring and located 90° apart around the circumference of said load ring, a load-applying piston positioned to be oscillated against each load-imparting pin in radial direction, an equal number of hydraulic pressure-producing cylinders, a fluid-containing hydraulic load-transmitting line connecting each load-applying piston to a main pressure-producing cylinder and an auxiliary pressure-producing cylinder, a pressure-producing piston within each pressure-producing cylinder for oscillating the fluid within said load-transmitting line and for cyclically increasing base pressure in the respective load-transmitting line, a motor driven cam shaft, cams on said shaft for oscillating each pressure-producing piston, means for varying the volume of the load-transmitting line thereby varying the degree of fluid compression in the hydraulic system, gearing connecting the motor driven cam shaft with the rotatable shaft for time phasing the oscillations of the pressure producing pistons with the speed of the rotatable shaft, means for determining the force which each load-imparting pin exerts on the load ring, and means for determining torque.

REGINALD J. S. PIGOTT.

REFERENCES CITED

The following references are of record in the file of this patent:

UNITED STATES PATENTS

| Number | Name | Date |
|---|---|---|
| 1,553,941 | Kasley | Sept. 15, 1925 |
| 1,995,832 | Boden | Mar. 26, 1935 |
| 2,471,423 | Gisser | May 31, 1949 |

FOREIGN PATENTS

| Number | Country | Date |
|---|---|---|
| 318,491 | Germany | Jan. 28, 1920 |
| 557,248 | France | Apr. 30, 1923 |